US011960044B2

(12) United States Patent
Guigné et al.

(10) Patent No.: US 11,960,044 B2
(45) Date of Patent: Apr. 16, 2024

(54) DISCRETE VOLUMETRIC ACOUSTIC AND RESISTIVITY METHOD AND APPARATUS FOR SUB-SEABED SURVEYING

(71) Applicant: PanGeo Subsea, Inc., St. John's (CA)

(72) Inventors: Jacques Y. Guigné, Paradise (CA); Nicholas G. Pace, Bath (GB)

(73) Assignee: Kraken Robotics Services Ltd., Mount Pearl (NL)

( * ) Notice: Subject to any disclaimer, the term of this patent is extended or adjusted under 35 U.S.C. 154(b) by 140 days.

(21) Appl. No.: 17/239,184

(22) Filed: Apr. 23, 2021

(65) Prior Publication Data

US 2021/0318460 A1 Oct. 14, 2021

Related U.S. Application Data

(63) Continuation of application No. PCT/IB2019/058613, filed on Oct. 9, 2019.

(Continued)

(51) Int. Cl.
*G01V 11/00* (2006.01)
*B63G 8/00* (2006.01)
(Continued)

(52) U.S. Cl.
CPC .............. *G01V 11/00* (2013.01); *B63G 8/001* (2013.01); *G01V 1/006* (2013.01); *G01V 1/3835* (2013.01); *G01V 3/02* (2013.01); *B63G 2008/007* (2013.01)

(58) Field of Classification Search
CPC ...... G01V 11/00; G01V 1/006; G01V 1/3835; G01V 3/02; G01V 1/284; G01V 1/3808;
(Continued)

(56) References Cited

U.S. PATENT DOCUMENTS 4,670,862 A 6/1987 Staron et al.
6,751,553 B2 * 6/2004 Young .................. G01V 11/002
342/22

(Continued)

FOREIGN PATENT DOCUMENTS

JP H07 151801 A 6/1995

OTHER PUBLICATIONS

Extended European Search Report dated Jun. 14, 2022, for European Application No. 219875290.9.

(Continued)

*Primary Examiner* — Ian J Lobo
(74) *Attorney, Agent, or Firm* — Richard A. Fagin

(57) ABSTRACT

A sub-bottom geophysical imaging apparatus includes a carriage assembly having at least one acoustic transmitter, and at least one acoustic receiver proximate the transmitter. A position determining transponder is mounted on the carriage. A plurality of position transponders is disposed at spaced apart positions to communicate with the transponder mounted on the carriage. A pair of tracks is provided for moving the carriage to selected positions above the bottom. Electrodes are provided for a resistivity sensor and a shear acoustic transmitter and receiver disposed in at least one of the pair of tracks. A signal processing unit is configured to coherently stack and beam steer signals detected by the line array, the electrodes and the shear transmitter and receiver. The signal processing unit is configured to record signals detected by the line array of acoustic receivers, the electrodes and the shear acoustic transmitter and receiver.

24 Claims, 11 Drawing Sheets

Related U.S. Application Data

(60) Provisional application No. 62/751,295, filed on Oct. 26, 2018.

(51) Int. Cl.
*G01V 1/00* (2006.01)
*G01V 1/38* (2006.01)
*G01V 3/02* (2006.01)

(58) Field of Classification Search
CPC .... G01V 1/3817; G01V 1/3852; G01V 3/088; G01V 3/165; G01V 2210/1427; G01V 2210/6163; B63G 8/001; B63G 2008/007; G01S 7/521; G01S 7/539; G01S 15/89
See application file for complete search history.

(56) References Cited

U.S. PATENT DOCUMENTS

| | | | |
|---|---|---|---|
| 9,030,914 B2* | 5/2015 | Guigne | G01V 1/3808 367/87 |
| 2007/0288211 A1 | 12/2007 | MacGregor et al. | |
| 2010/0231247 A1 | 9/2010 | Cho et al. | |
| 2013/0258811 A1 | 10/2013 | Guigne et al. | |
| 2016/0274235 A1 | 9/2016 | Martin et al. | |

OTHER PUBLICATIONS

International Search Report, International Application No. PCT/IB2019/058613 dated Jan. 15, 2020.
Written Opinion of the International Search Authority, International Application No. PCT/IB2019/058613 dated Jan. 15, 2020.
Examination Report dated Jan. 17, 2024, for Canadian Patent Application No. 3,117,832.

* cited by examiner $$FF = \frac{\text{Apparent Resistivity of Porous Media}}{\text{Resistivity of Pore Fluid}}$$

$FF = 1.30 * \eta^{-1.45}$ (Lovell, 1984)

$FF = 1.29 * \eta^{-1.42}$ (Boyce, 1968)

$\eta = (1.3861 - 0.4626*(FF) + 0.0833*(FF)2 - 0.0073*(FF)3$

| Porosity $\eta$ | FF (Lovell) | FF (Boyce) |
|---|---|---|
| 20% | 13.410651 | 12.68023 |
| 30% | 7.4493355 | 7.129803 |
| 40% | 4.9085856 | 4.7387579 |
| 50% | 3.5517047 | 3.4518531 |
| 60% | 2.7266164 | 2.6644952 |
| 70% | 2.1804754 | 2.1406738 |
| 80% | 1.7966475 | 2.17709322 |
| 90% | 1.5145782 | 1.4981847 |
| 100% | 1.3 | 1.29 |

Porosity: Sand 43% to 36% Clay 51% and higher
Gravel can be as low as 0.20

DISCRETE VOLUMETRIC ACOUSTIC AND RESISTIVITY METHOD AND APPARATUS FOR SUB-SEABED SURVEYING

CROSS REFERENCE TO RELATED APPLICATIONS

Continuation of International Application No. PCT/IB2019/058613 filed on Oct. 9, 2019. Priority is claimed from U.S. Provisional Application No. 62/751,295 filed Oct. 26, 2018. Both the foregoing applications are incorporated herein by reference in their entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of generally to the field of imaging shallow formations and discrete petrophysical anomalies below the bottom of a body of water. More specifically, the invention relates to methods and apparatus for acquiring higher resolution images below the bottom of a body of water than is currently possible using devices known in the art.

U.S. Pat. No. 9,030,914 issued to Guigné et al. discloses a method for imaging formations below the bottom of a body of water. Such method includes imparting acoustic energy into the formations along a predetermined length swath at a selected geodetic position. Acoustic energy reflected from the formations is detected along a line parallel to the length of the swath. The selected geodetic position is moved a selected distance transverse to the length of the swath. The imparting acoustic energy, detecting acoustic energy and moving the geodetic position are repeated until a selected distance transverse to the length of the swath is traversed. The detected acoustic energy from all the selected geodetic positions is coherently stacked. The detected acoustic energy is beam steered to each of a plurality of depths and positions along the length of the swath to generate an image for each such depth and position.

Electrical resistivity is a parameter of interest in imaging and characterizing sediments and rock formations. Electrical resistivity may be measured using galvanic measuring devices, electromagnetic induction devices, controlled source electromagnetic devices and magnetotelluric devices. Such devices may be conveyed through wellbores drilled through the sediments or formations, may be disposed in cables deployed on the land surface or water bottom, or may be in the form of towed arrays of sensors such as may be towed by a water-borne vessel or aircraft. Measurements made by any or all of such devices may be inverted to obtain spatial distribution of electrical resistivity in a known volume of such sediments and formations.

It is desirable to have measurements related to electrical resistivity of sediments and/or rock formations that are geometrically related to images made using the method disclosed in the '914 patent in order to provide more accurate imaging of spatial distribution of properties of the sediments or rock formations.

SUMMARY

A sub-bottom geophysical imaging apparatus according to one aspect of the disclosure includes a carriage assembly having mounted thereon at least one acoustic transmitter, and at least one acoustic receiver mounted proximate the transmitter. A line array of acoustic receivers is mounted on the carriage assembly in a direction transverse to a direction of motion of the carriage assembly. A position determining transponder is mounted on the carriage assembly. A plurality of position determining transponders is disposed at spaced apart positions and configured to communicate with the transponder mounted on the carriage assembly. At least two tracks are provided for moving the carriage assembly to selected positions above the water bottom. Electrodes for a resistivity sensor and a shear acoustic transmitter and receiver are disposed proximate to at least one of the pair of tracks. A signal detection and processing unit is configured to coherently stack and beam steer signals detected by the line array of acoustic receivers, the electrodes and the shear acoustic transmitter and receiver, the signal detection and processing unit configured to record signals detected by the line array of acoustic receivers, the electrodes and the shear acoustic transmitter and receiver.

Some embodiment further comprise a frame deployable on the water bottom, the frame having a grid of support cables thereon, the carriage assembly configured to move along the grid of support cables.

In some embodiments, wherein the means for moving comprises at least one of a remotely operated underwater vehicle and an autonomously operated underwater vehicle.

In some embodiments, the at least one of a remotely operated underwater vehicle and an autonomously operated underwater vehicle comprises a boom extending therefrom, and further comprising at least one acoustic receiver mounted proximate the transmitter and the line array of acoustic receivers are movably mounted on the boom.

Some embodiments further comprise a sensor for determining position of the at least one acoustic receiver mounted proximate the transmitter and the line array of acoustic receivers with reference to the boom.

In some embodiments, the vehicle comprises means for rotating the boom to a selected rotary orientation.

In some embodiments, the at least one acoustic transmitter comprises a chirp projector.

Some embodiments further comprise three chirp projectors arranged on the carriage assembly to emit acoustic energy in a predetermined pattern along the water bottom.

In some embodiments, the signal detection and processing unit further comprises means for determining a sub-bottom velocity model from signals detected by the at least two line arrays and signals detected by the at least one acoustic receiver proximate the at least one acoustic transmitter.

In some embodiments, the electrodes comprise current source electrodes and voltage measuring electrodes disposed in an electrically insulating layer affixed to the at least one track.

In some embodiments, the shear acoustic transmitter and receiver comprise transducers embedded in the at least one track.

In some embodiments, the electrodes are disposed in a plurality of spaced apart wheels rotatably supported from an electrode frame.

In some embodiments, each of the wheels comprises a plurality of radially extending spikes about a circumference of each wheel.

A method for imaging formations below the bottom of a body of water according to another aspect of this disclosure includes imparting acoustic energy into the formations along a predetermined length swath at a selected geodetic position using at least one acoustic transmitter mounted to a carriage assembly. Acoustic energy reflected from the formations along a line parallel to the length of the swath at the selected geodetic position is detected using a line array of acoustic receivers mounted to the carriage assembly. The selected geodetic position is moved a selected distance transverse to the length of the swath. The imparting acoustic energy, detecting acoustic energy and moving the selected geodetic position are repeated until a selected distance transverse to the length of the swath is traversed. The detected acoustic energy from all the selected geodetic positions is coherently stacked. Electric current is emitted into the formations through electrodes disposed proximate to a track used to move the carriage assembly. Voltage induced by the electric current across electrodes disposed proximate to the track is measured. Shear acoustic energy is emitted and detected using shear acoustic transducers embedded proximate to the track. The detected acoustic energy is beam steered to each of a plurality of depths and positions along the length of the swath. A resistivity and shear acoustic properties are calculated to generate an image for each such depth and position.

Some embodiments further comprise (a) moving the position of imparting acoustic energy, emitting and detecting voltage and emitting and detecting shear acoustic energy a selected distance along the length of the swath, and (b) repeating the imparting acoustic energy, detecting acoustic energy, emitting and detecting voltage and emitting and detecting shear acoustic energy and moving the geodetic position transversely to the length of the swath, and repeating (a) and (b) until a selected area of the water bottom has been traversed.

Some embodiments further comprise (c) detecting acoustic energy reflected from the formations at a plurality of positions using at least two substantially orthogonal line arrays of receivers disposed on the water bottom; (d) beam steering the detected acoustic energy, as defined in (c), to each of a plurality of depths and positions to generate an image for each such depth and position, to enhance forward scatter of the sub-bottom (e) detecting acoustic energy reflected from the formations at a position proximate the position of imparting acoustic energy; (f) beam steering the detected acoustic energy, as defined in (e), to each of a plurality of depths and positions to generate an image for each such depth and position, to enhance backscatter of the sub-bottom; (g) detecting reflected acoustic energy at each time when the position of imparting acoustic energy is coincident with a position of each receiver in the orthogonal arrays; (h) processing the data, as defined in (g), by enhancement of specular reflections to obtain a velocity model of the sub-bottom; (i) generating a model of acoustic velocity distribution using the detected acoustic energy from each of (c) through (h); and (j) using the acoustic velocity distribution model to correct the images generated from the beam steered, coherently stacked detected acoustic energy.

In some embodiments, the moving of the selected geodetic position comprises: determining a geodetic position of the carriage assembly; extending a frame along a boom extending laterally in a selected direction from the carriage assembly by a selected amount, the frame having mounted thereon a least one acoustic transmitter and a line array of acoustic receivers oriented transversely to a direction of the boom; and repeating the imparting acoustic energy, detecting acoustic energy and extending the frame until a selected distance transverse to the length of the swath is traversed.

In some embodiments, the determining geodetic position of the carriage assembly comprises determining acoustic energy travel time between a transponder disposed on the carriage assembly and a plurality of spaced apart transponders disposed proximate the water bottom.

Some embodiments further comprise rotating the boom substantially transversely to a first side of the selected direction and repeating the extending, the imparting acoustic energy, detecting acoustic energy and extending the frame until a selected distance transverse to the length of the swath is traversed.

Some embodiments further comprise rotating the boom substantially to a second side of the selected direction and repeating the extending, the imparting acoustic energy, detecting acoustic energy and extending the frame until a selected distance transverse to the length of the swath is traversed.

Some embodiments further comprise moving the carriage assembly in a selected direction, returning the boom to the selected direction and repeating the extending, the imparting acoustic energy, detecting acoustic energy and extending the frame until a selected distance transverse to the length of the swath is traversed.

Some embodiments further comprise rotating the boom substantially transversely to a first side of the selected direction and repeating the extending, the imparting acoustic energy, detecting acoustic energy and extending the frame until a selected distance transverse to the length of the swath is traversed.

Some embodiments further comprise rotating the boom substantially to a second side of the selected direction and repeating the extending, the imparting acoustic energy, detecting acoustic energy and extending the frame until a selected distance transverse to the length of the swath is traversed.

Some embodiments further comprise emitting electric current into the formations through each of a plurality of pairs electrodes disposed proximate to the track; detecting voltage induced by the electric current across each of a plurality of pairs of electrodes disposed proximate to the track; and calculating an image of apparent resistivity of sub-bottom formations using the detected voltages.

Some embodiments further comprise determining acoustic attenuation from the detected acoustic energy.

DETAILED DESCRIPTION

Figure 1:
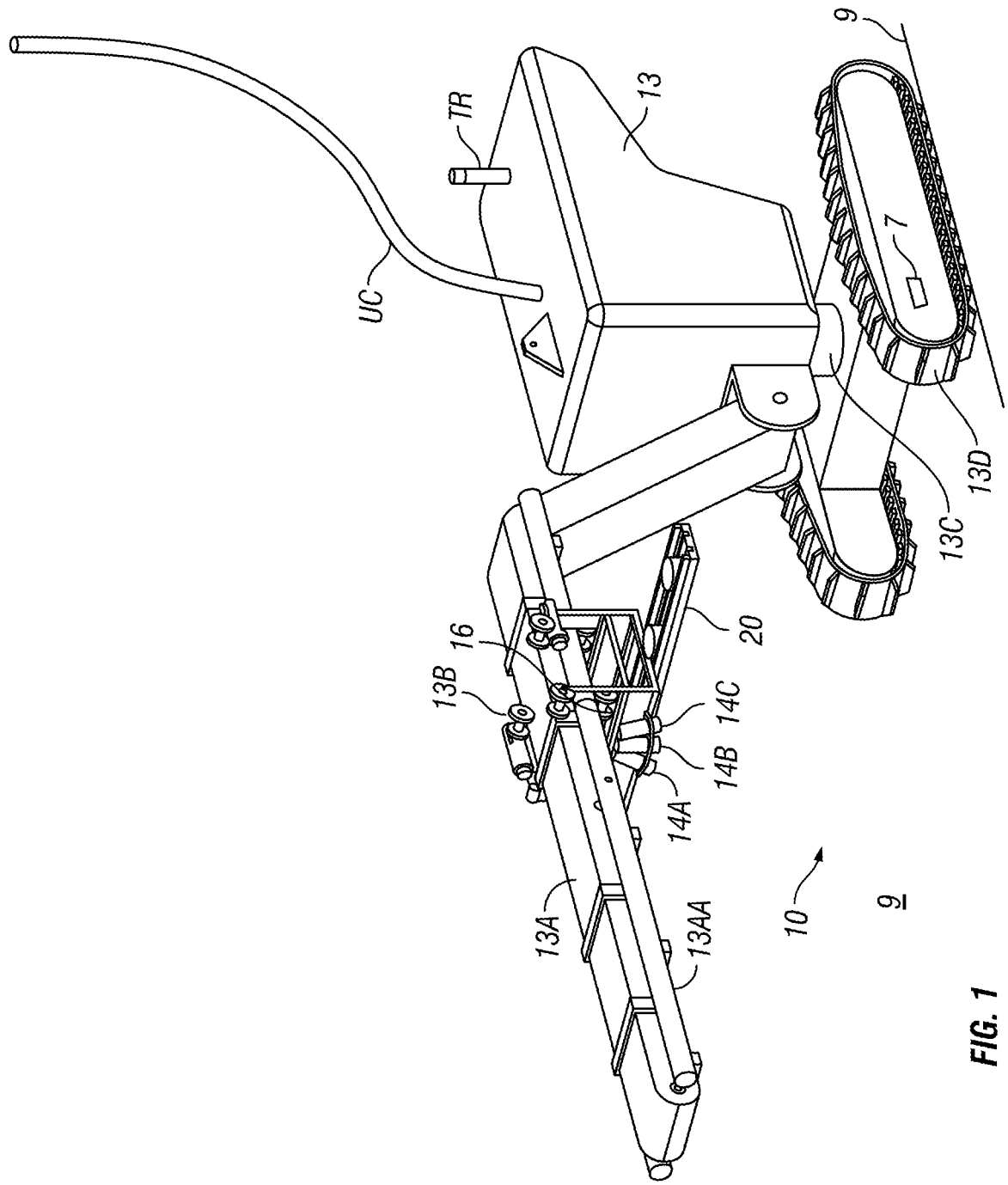
FIG. 1 shows an example vehicle for making measurements on the bottom of a body of water.

FIG. 1 shows an example remotely operated vehicle (ROV) or autonomously operated underwater vehicle (AUV), hereinafter "vehicle" 10, disposed on the bottom of a body of water. The vehicle 10 may include a propulsion and directional control system 13 of any type known in the art. The vehicle 10 may include an umbilical cable UC if it is an ROV operated from above the water surface, or if the vehicle is an AUV, there may be no umbilical cable. The vehicle 10 may be propelled, for example, by tracks 13D driven by a motor (not shown separately) disposed in the propulsion and directional control system 13. The propulsion and directional control system 13 may include thereon a transponder TR used to determine a position of the vehicle 10 that can be precisely correlated to geodetic position thereof. The propulsion and directional control system 13 may include a boom 13A mounted thereto such that signal acquisition components, explained below, may be disposed at a selected elevation above the water bottom 9 and enables the signal acquisition components to be moved precisely determinable distances along the length of the boom 13A. The signal acquisition components may include a vertical incidence receiver 16, e.g., a hydrophone mounted proximate one or more chirp projectors 14A, 14B, 14C. The foregoing component may be mounted on a frame 13B movable, for example, using wheels, on tracks or rails 13AA mounted on the boom 13. Mounted proximate the base of the frame 13B may be a line array of acoustic receivers 20. The receivers in the line array 20 may be, for example, hydrophones. Programming of an AUV if used and/or remote operation of an ROV may include operating the propulsion and directional control system 13 to cause the vehicle 10 to move in selected incremental distances along a line, move a selected distance transverse to the line and repeat the incremental distance motion along a line transversely spaced from the first or previous line. In the present example, a direction that the boom 13A extends from the propulsion and directional control system 13 may be selectively rotated by mounting thereof to the tracks 13B using a turret 13C or similar device. The vehicle 10 may be moved along the water bottom 9 by treads 13D such as those used on earth moving equipment.

A water resistivity sensor 7 may be disposed at a convenient location on the vehicle 10 to obtain measurements of resistivity of the surrounding water proximate the water bottom 9. A possible use of such resistivity measurements will be explained further with reference to FIGS. 13 and 14.

During survey operation, the vehicle 10 may be maintained at a fixed position, and the frame 13B may be stationary at a selected position along the boom 13A. The chirp projectors 14A, 14B, 14C, vertical incidence receiver 16 and line array 20 may be operated so as to acquire acoustic signals from below the water bottom 9. After such acquisition, the frame 13B may be moved a selected distance along the boom 13A, for example, 5 centimeters, and the foregoing acoustic signal acquisition process may be repeated. The foregoing may be repeated a number of times after successive movements of the frame 13B until the frame 13B has traveled the entire length of the boom 13A. A result is to acquire signals that can be processed as a synthetic aperture sonar SAS along the direction of motion or advance of the frame (13B in FIG. 1) during the foregoing acquisition procedure.

Although not shown separately for clarity of the illustration in FIG. 1, the propulsion and directional control system 13 may comprise suitable electronic circuits and components to actuate acoustic transmitters, measure and record signals detected by the various acoustic sensors on the vehicle 10. Circuits may also be provided to emit electric current and measure electrical voltages across electrodes to be explained further below. The foregoing types of circuits are well known in the art.

Figure 2:
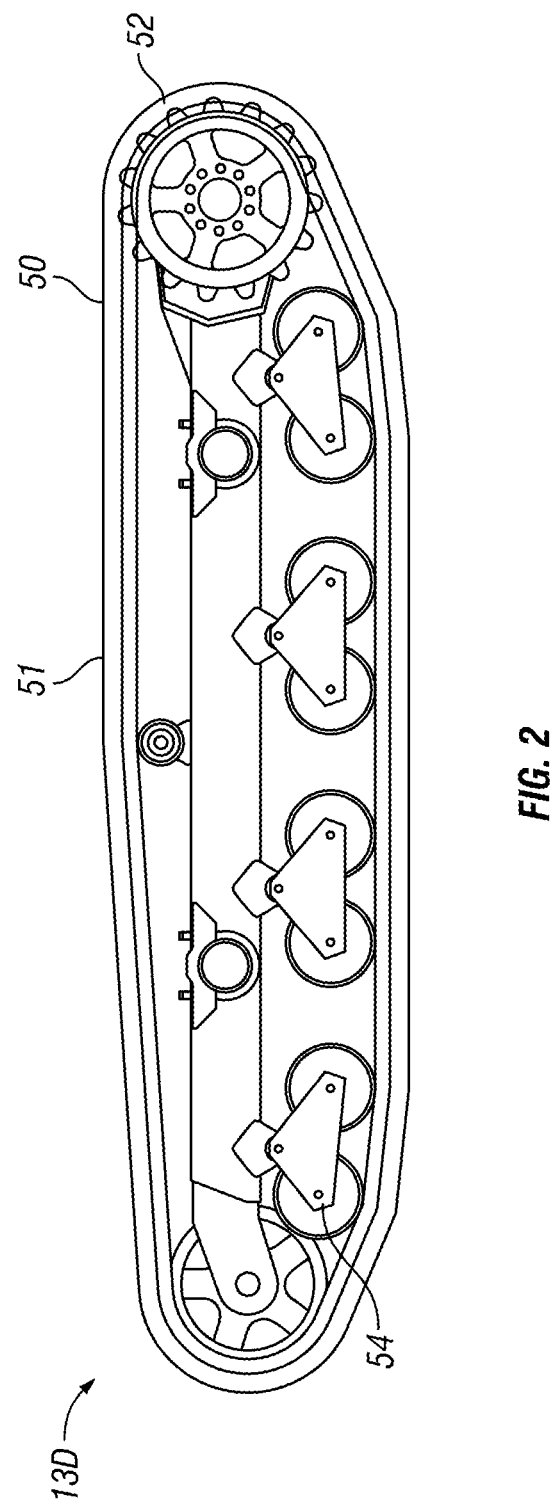
FIG. 2 shows an example embodiment of a track for the vehicle shown in FIG. 1.

FIG. 2 shows an example embodiment of one of the treads 13D. The tread 13D may comprise a track 50 engaged with a drive sprocket 52 and idler sprockets 54. The track 50 may be configured and made from materials such as are used in well-known track-type vehicle propulsion devices. The track 50 may be made from and/or covered on its exterior surface with an insulating layer 51 such as may be made from natural or synthetic rubber, or polyurethane.

Figure 3:
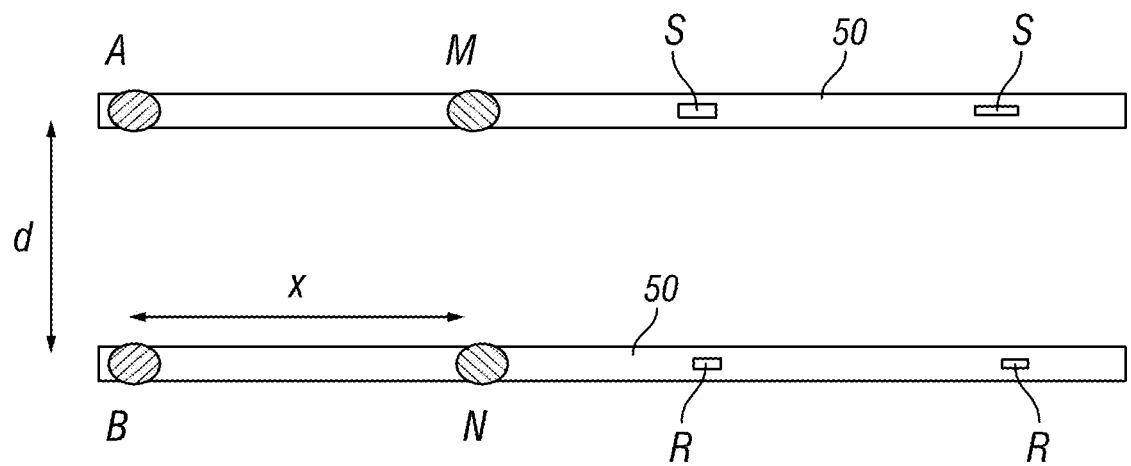
FIG. 3 shows an example embodiment of resistivity measuring electrodes disposed in an insulating layer.

FIG. 3 shows an example embodiment of resistivity measuring electrodes disposed in the insulating layer (51 in FIG. 2) so as to contact the water bottom (9 in FIG. 1) as the vehicle (13 in FIG. 1) moves along the water bottom (9 in FIG. 1). Other embodiments of electrodes will be explained below with reference to FIGS. 13 and 14. The electrodes provide electrically isolated points of contact between sediments (formations) below the track (13D in FIG. 2) and electrical circuit components in or about the vehicle 10 as explained above. The electrodes may comprise measuring current electrodes A, B connected across the terminals of a measuring current source (not shown separately for clarity) disposed in or about the vehicle 10. The measuring current source may comprise a low frequency (0.1 to 1 Hz) AC source to minimize mutual inductance effects, i.e., approximating DC response in making galvanic resistivity measurements while avoiding polarization of the electrodes, or may comprise a frequency or time domain controlled electromagnetic current source. Irrespective of the type of measuring current source, current imparted across the measuring current electrodes A, B will induce electric current and/or an electromagnetic field in the sediments or formations below the water bottom (9 in FIG. 1). Voltage measuring electrodes M, N may be electrically connected to a voltage measuring circuit (not shown for clarity) in or about the vehicle 10.

Induced and/or imparted voltage across the voltage measuring electrodes M, N may be measured by such circuit in order to characterize spatial distribution of electrical resistivity in the sediments and/or formations below the water bottom. In the embodiment shown in FIG. 3, the measuring current electrodes A, B are disposed on or in opposed tracks, shown at 50 in FIG. 3, wherein the tracks are separated by a distance d.

The measuring current electrodes A, B may be arranged to be at corresponding longitudinal positions along each track 50. The voltage measuring electrodes M, N may also be disposed on opposed tracks 50 and arranged to be at corresponding longitudinal positions along each track 50. The voltage measuring electrodes M, N may be spaced apart from the measuring current electrodes A, B by a longitudinal distance a.

FIG. 3 also shows, as in some embodiments, shear wave acoustic energy sources S disposed in the track 50 at a selected distance from each other, which may be distance x or any other suitable distance. The shear wave sources S may be in the form of a blade, button or similar device to be placed in contact with the water bottom (9 in FIG. 1) and having therein or coupled to any form of device to move the button or blade laterally with respect to the water bottom. The other track may comprise shear wave acoustic sensors R also spaced apart at a selected distance (e.g., distance x). The sources S and sensors R may excite and detect shear waves in the formations and/or sediments below the water bottom, wherein image volumes for shear waves in the sub-bottom may be at least partially coincident with image volumes for the other sensors on the AUV.

Figure 4:
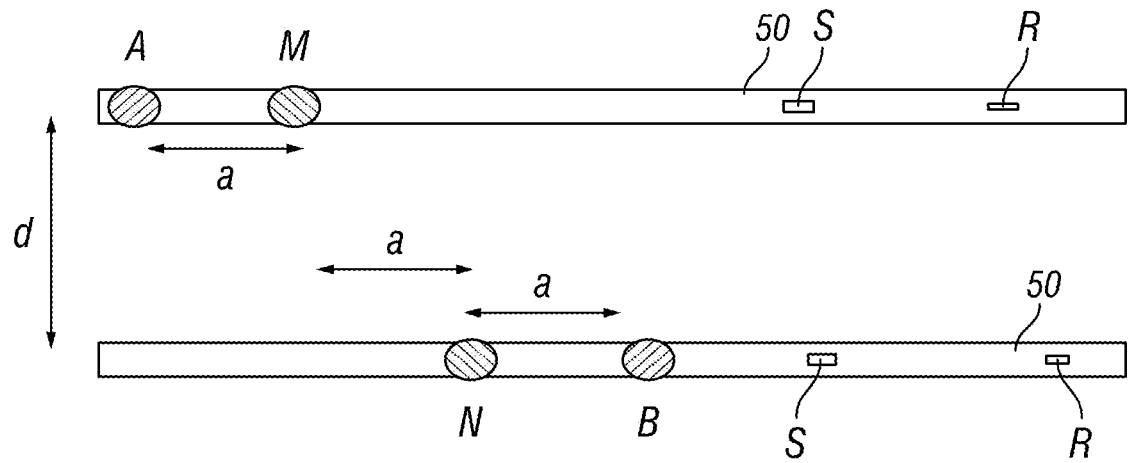
FIG. 4 shows another example embodiment of electrodes disposed on tracks.

FIG. 4 shows another example embodiment of electrodes disposed on the tracks. In the example embodiment of FIG. 4, one measuring current electrode A and one voltage measuring electrode M may be disposed on one track 50 and the other measuring current electrode B and voltage measuring electrode N may be disposed on the opposed track 50. Longitudinal spacing between respective electrodes may be defined by a distance a. The tracks are separated by a distance d. The arrangements shown in FIGS. 3 and 4 may be replicated at selected longitudinal positions along the tracks such that individual sets of electrodes are in electrical contact with the water bottom and the circuits as the treads (13D in FIG. 1) move along the water bottom. In some embodiments, the electrodes A, B, M, N may be electrically connected to the respective circuits in or about the vehicle by extending an electrical contactor (not shown) through the respective track such that when a particular electrode is disposed below one of the idler sprockets (54 in FIG. 2), the idler sprocket will be in electrical contact with such electrode. The respective idler sprocket may be electrically connected to a respective terminal on the respective circuit in or about the vehicle. In such embodiments comprising a plurality of sets of electrodes, as the track moves longitudinally along the water bottom, consecutively spaced sets of electrodes will be electrically connected to the respective circuit terminals. In such embodiments, more spatially dense measurements may be made than in embodiments having only a single set of electrodes.

FIG. 4 also shows, as in some embodiments, shear wave acoustic energy sources S disposed in the opposed tracks 50 at a selected distance from each other, which may be distance d or any other suitable distance. The shear wave sources S may be in the form of a blade, button or similar device to be placed in contact with the water bottom and having therein or coupled to any form of device to move the button or blade laterally with respect to the water bottom. The same respective track 50 may comprise shear wave acoustic sensors R also spaced apart at a selected distance (e.g., distance x). The sources S and sensors R may excite and detect shear waves in the formations and/or sediments below the water bottom, wherein image volumes for shear waves in the sub-bottom may be at least partially coincident with image volumes for the other sensors on the AUV.

In some embodiments, the shear wave acoustic sensors S, R may be disposed in the same and in opposed tracks, that is, a combination of what is shown in FIG. 3 and in FIG. 4 to enable determining shear wave properties of the formations and/or sediments below the water bottom both in the inline direction and the cross-lime direction. In line may be used to designate along the direction of motion of the AUV, while cross-line may mean in a direction transverse to the direction of motion of the AUV.

By obtaining measurements in an at least partially coincident volume as the other measurements made by the various sensors on the AUV, a relationship between shear wave propagation characteristics as well as compressional wave characteristics may be determined for the formations and/or sediments below the water bottom.

Response of the arrangements shown in FIGS. 3 and 4 to simulated formation or sediment layers below the tracks, a simulated insulating layer thickness and simulated water having certain resistivity will be explained with reference to FIGS. 5 through 12 to illustrate that the track and electrode arrangements shown herein may be used to determine resistivity distribution below the tracks 50. In the examples of FIGS. 5 through 12, simulated DC response of a galvanic measurement system is described, wherein voltage imparted across the voltage measuring electrodes M, N results from current imparted into the sediments/formations below the tracks 50. The imparted voltage may be used to determine an apparent resistivity. FIGS. 5 through 12 show apparent resistivity in relation to variation in parameters explained below.

Figure 5:
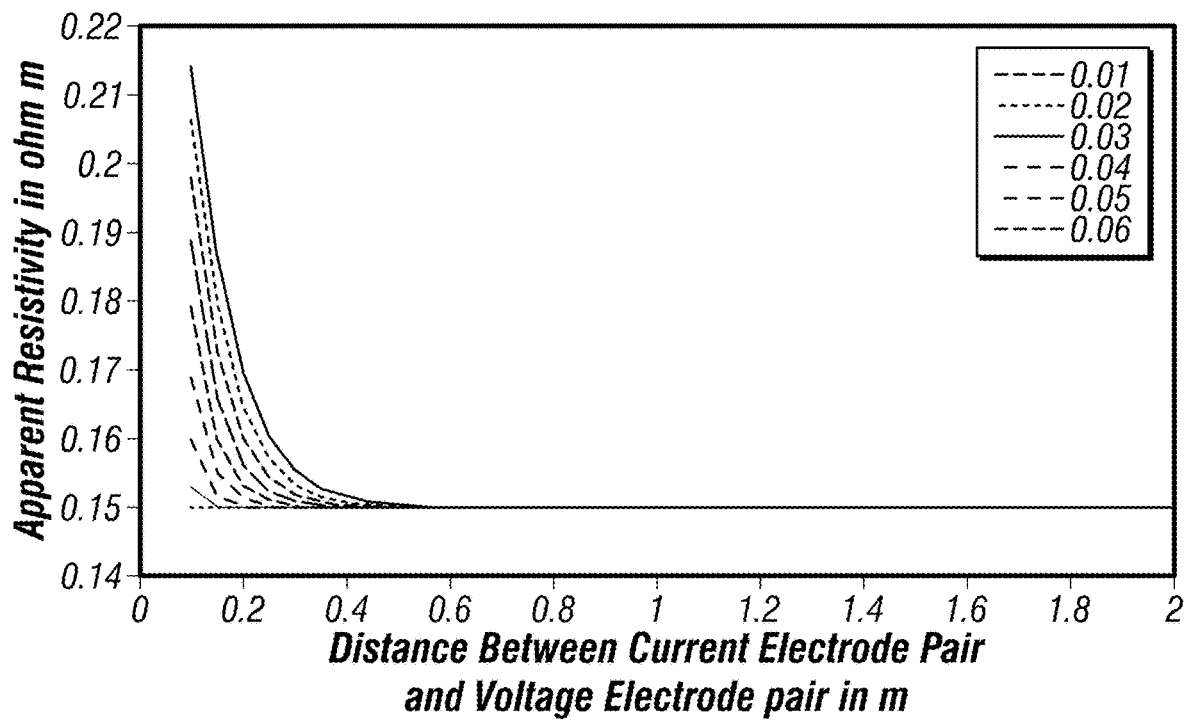
FIG. 5 shows a graph of apparent resistivity with respect to distance between measure current electrodes and voltage measuring electrodes.

FIG. 5 shows a graph of apparent resistivity with respect to the distance between the measure current electrodes and the voltage measuring electrodes in the arrangement shown in FIG. 3 for a variation with insulator layer thickness at a constant distance d between tracks (50 in FIG. 2) of 2 m. Current electrodes A, B are placed on each track, opposite each other. The voltage measuring electrodes M, N are placed on each track opposite each other. The spacing along the track a between the current electrodes A, B and the voltage measuring electrodes M, N is varied. The situation is a sediment with a layer at 0.3 m depth. The top sediment has resistivity of 0.6 ohm m and the lower sediment has a resistivity of 0.6 ohm m. The electrical insulating layer on the tracks has thickness ranging from 1 to 6 cm. Above the electrical insulating layer is water of resistivity 0.2 ohm-m.

Figure 6:
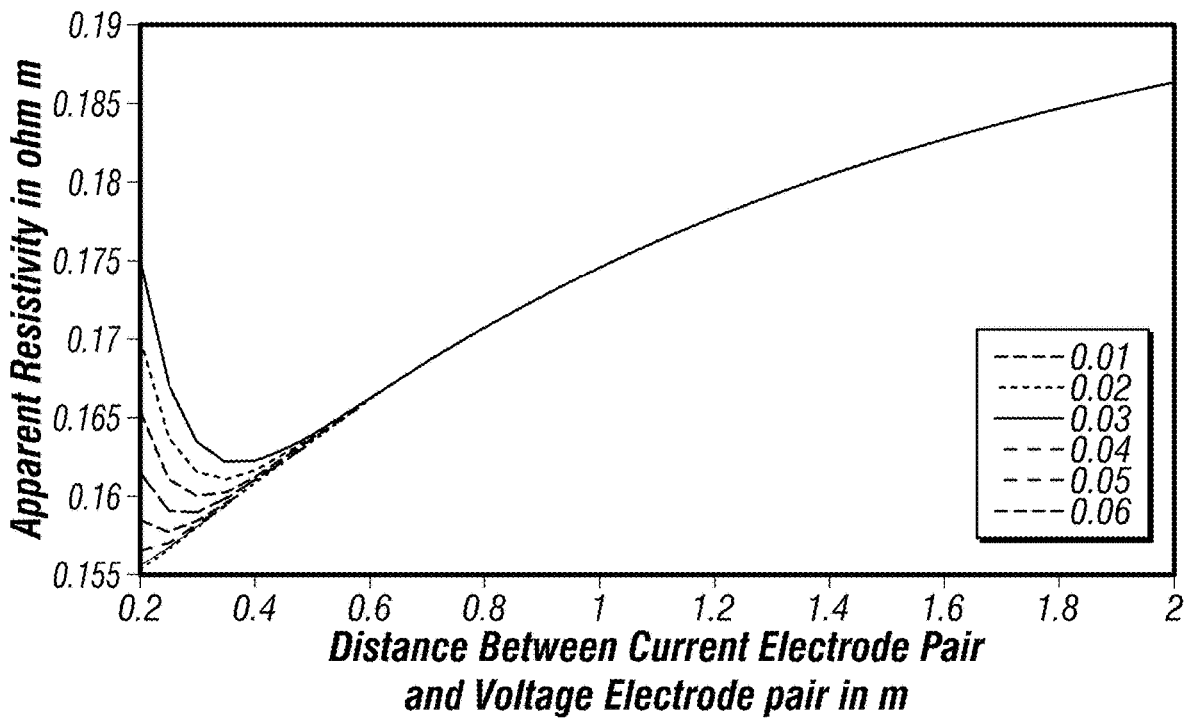
FIG. 6 shows a graph of variation of apparent resistivity with respect to insulating layer thickness.

FIG. 6 shows a graph of variation of apparent resistivity with respect to insulating layer thickness for a constant distance between tracks d of 2 m for the arrangement of electrode shown in FIG. 3. Current electrodes A, B are placed on each track, opposite each other. The voltage measuring electrodes M, N are placed on each track opposite each other. The spacing a along the track between the current electrodes A, B and the voltage measuring electrodes M, N is varied. The situation is a sediment with a layer at 0.3 m depth. The top sediment has resistivity of 0.6 ohm-m and the lower sediment has a resistivity of 0.8 ohm-m. The electrical insulating layer has thickness ranging from 1 to 6 cm. Above the insulating layer is water of resistivity 0.2 ohm m.

Figure 7:
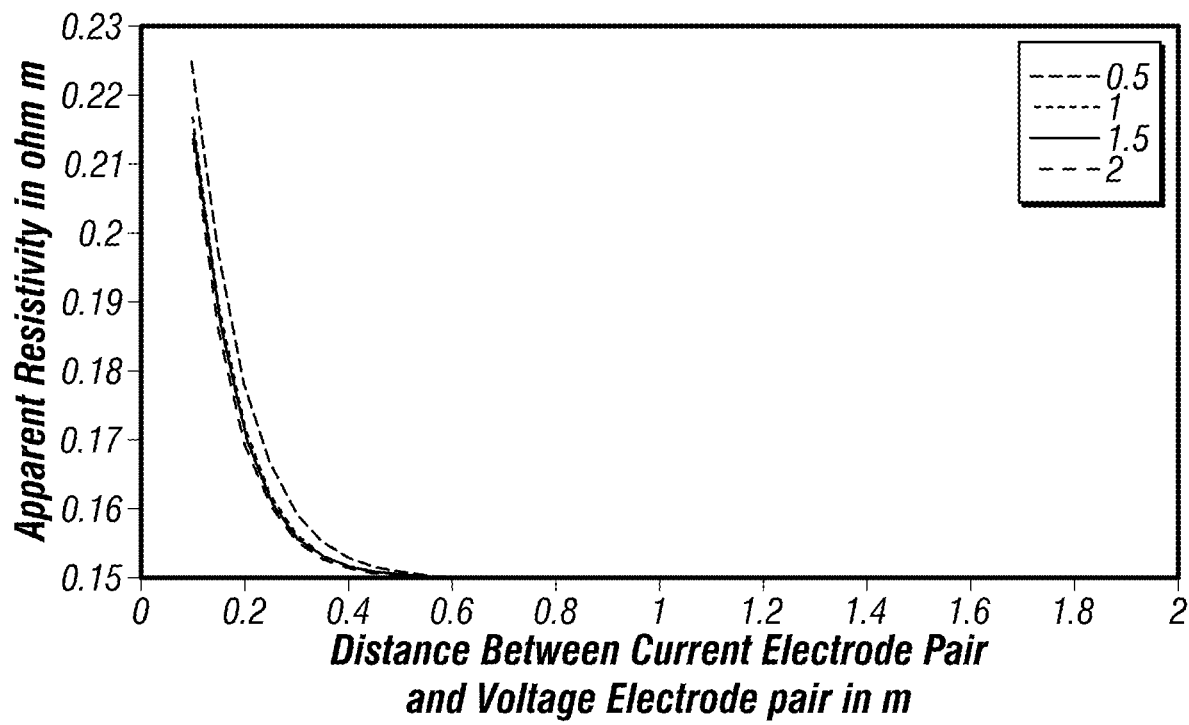
FIG. 7 shows a graph of variation of apparent resistivity with respect to distance between tracks d (0.5 to 2 m) for a constant electrical insulating layer thickness.

FIG. 7 shows a graph of variation of apparent resistivity with respect to distance between tracks d (0.5 to 2 m) for a constant electrical insulating layer thickness of 10 cm for the arrangement of electrode shown in FIG. 3. Current electrodes A, B are placed on each track, opposite each other. The voltage measuring electrodes M, N are placed on each track opposite each other. The spacing along the track a between the current electrodes A, B and the voltage measuring electrodes M, N is varied. The situation is a sediment with a layer at 0.3 m depth. The top sediment has resistivity of 0.6 ohm-m and the lower sediment has a resistivity of 0.6 ohm-m. The insulating layer has thickness of 10 cm. Above the insulating layer is water of resistivity 0.2 ohm-m.

Figure 8:
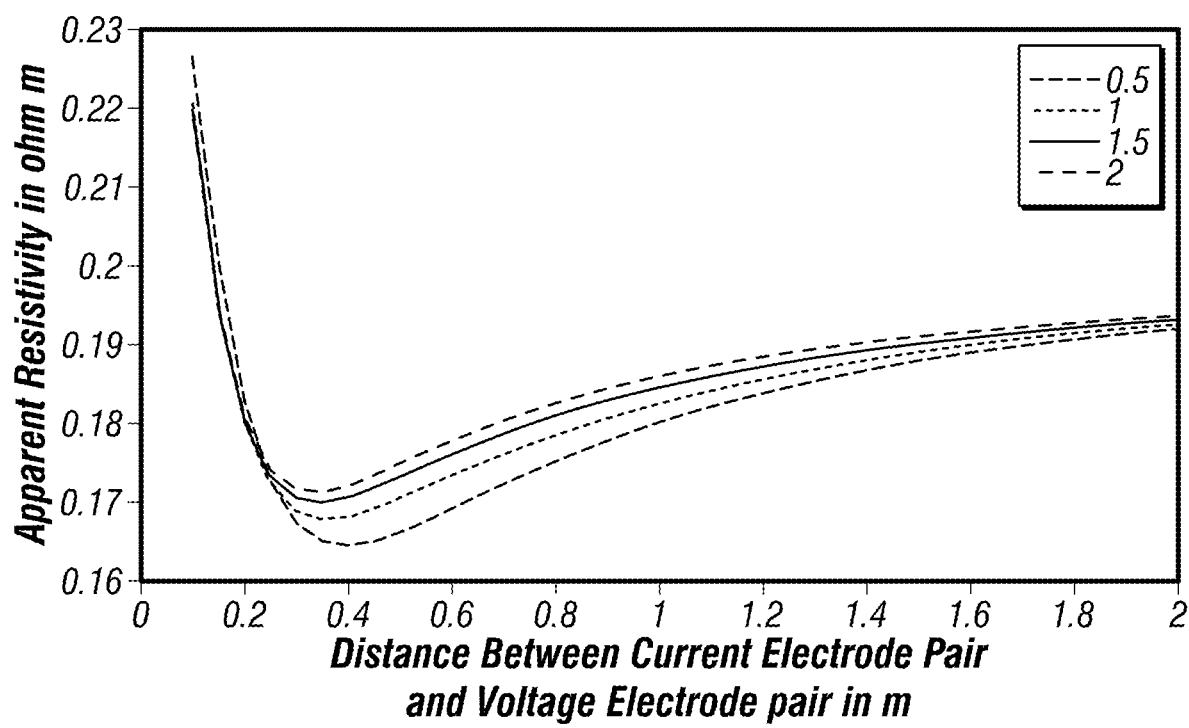
FIG. 8 shows a graph of variation of apparent resistivity with respect to distance between tracks d (0.5 to 2 m) for a constant insulator thickness.

FIG. 8 shows a graph of variation of apparent resistivity with respect to distance between tracks d (0.5 to 2 m) for constant insulator thickness of 10 cm for the arrangement shown in FIG. 3. Current electrodes A, B are placed on each track, opposite each other. The voltage measuring electrodes M, N are placed on each track opposite each other. The spacing along the track a between the current electrodes A, B and the voltage measuring electrodes M, N is varied. The situation is a sediment with a layer at 0.3 m depth. The top sediment has resistivity of 0.6 ohm-m and the lower sediment has a resistivity of 0.8 ohm-m. The insulating layer has thickness of 10 cm. Above the insulating layer is water of resistivity 0.2 ohm-m.

Figure 9:
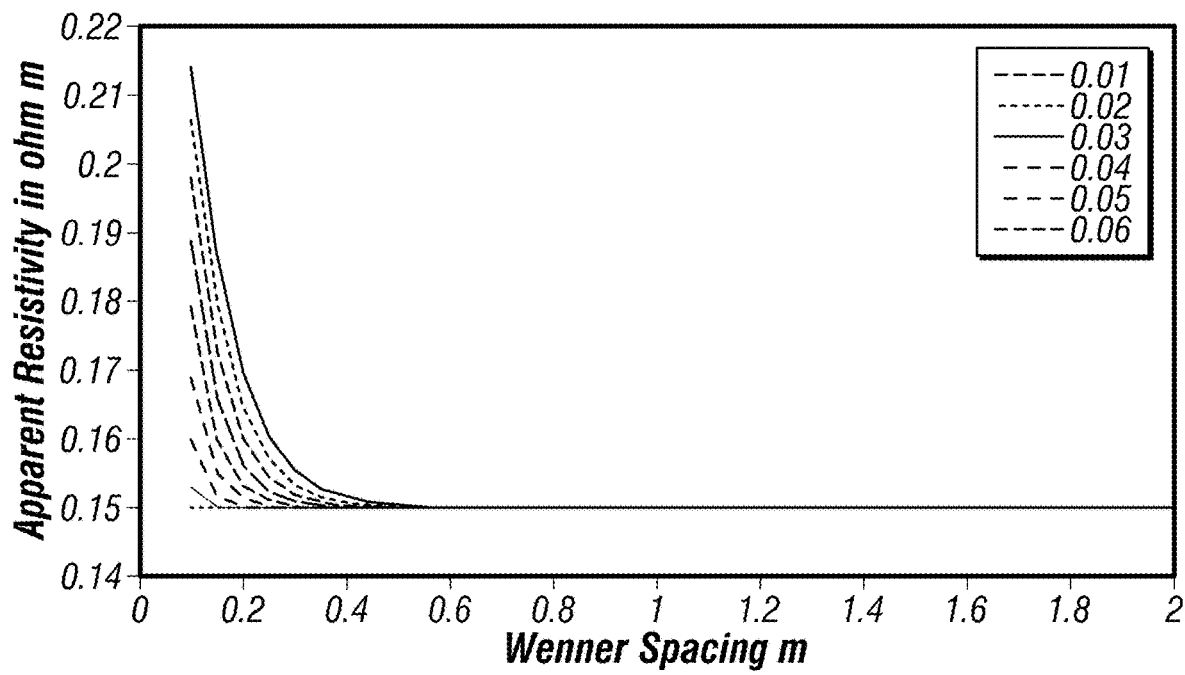
FIG. 9 shows a graph of variation of apparent resistivity with respect to insulator thickness for a constant distance between tracks.

FIG. 9 shows a graph of variation of apparent resistivity with respect to insulator thickness for a constant distance between tracks d of 2 m for the electrode arrangement shown in FIG. 4. The current electrodes A, B are disposed on one track and the voltage measuring electrodes M, N are disposed on the other track. The situation is a sediment with a layer at 0.3 m depth. The top sediment has resistivity of 0.6 ohm-m and the lower sediment has a resistivity of 0.6 ohm-m. The electrical insulating layer has thickness ranging from 1 to 6 cm. Above the insulating layer is water of resistivity 0.2 ohm m.

Figure 10:
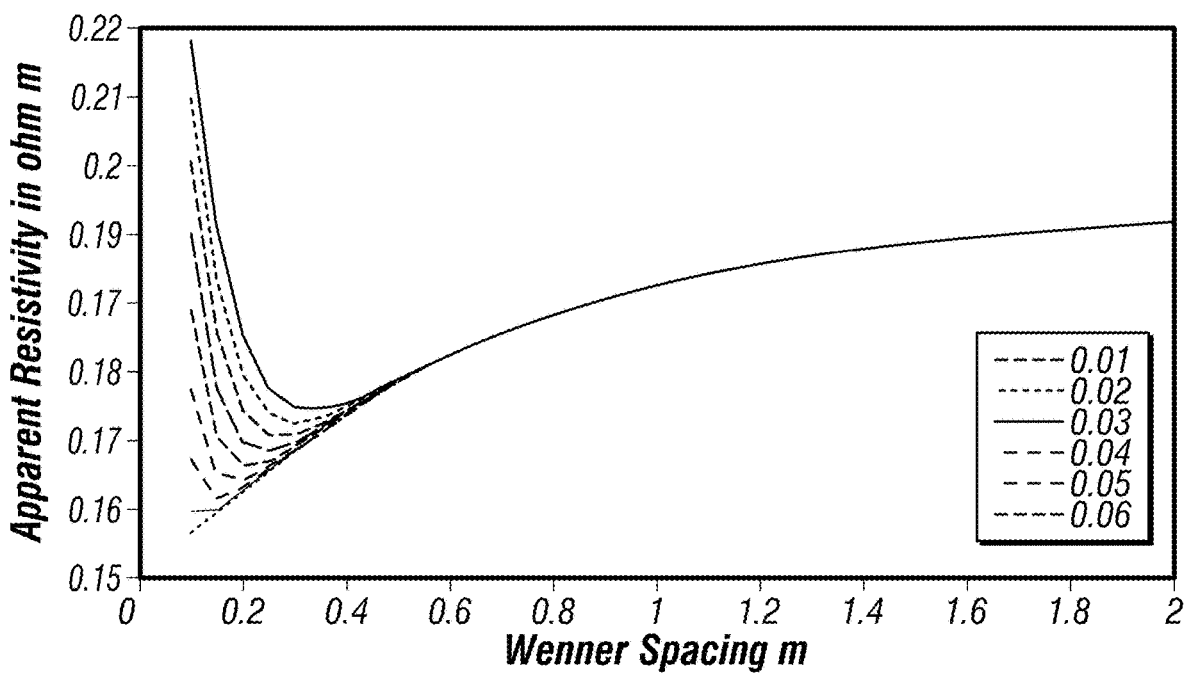
FIG. 10 shows a graph of variation of apparent resistivity with respect to insulator thickness for a constant distance between tracks.

FIG. 10 shows a graph of variation of apparent resistivity with respect to insulator thickness for a constant distance between tracks d of 2 m for the arrangement shown in FIG. 4. The current electrodes A, B are disposed on one track and the voltage measuring electrodes M, N are disposed on the other track The situation is a sediment with a layer at 0.3 m depth. The top sediment has resistivity of 0.6 ohm m and the lower sediment has a resistivity of 0.8 ohm m. The insulating layer has thickness ranging from 1 to 6 cm. Above the insulating layer is water of resistivity 0.2 ohm-m.

Figure 11:
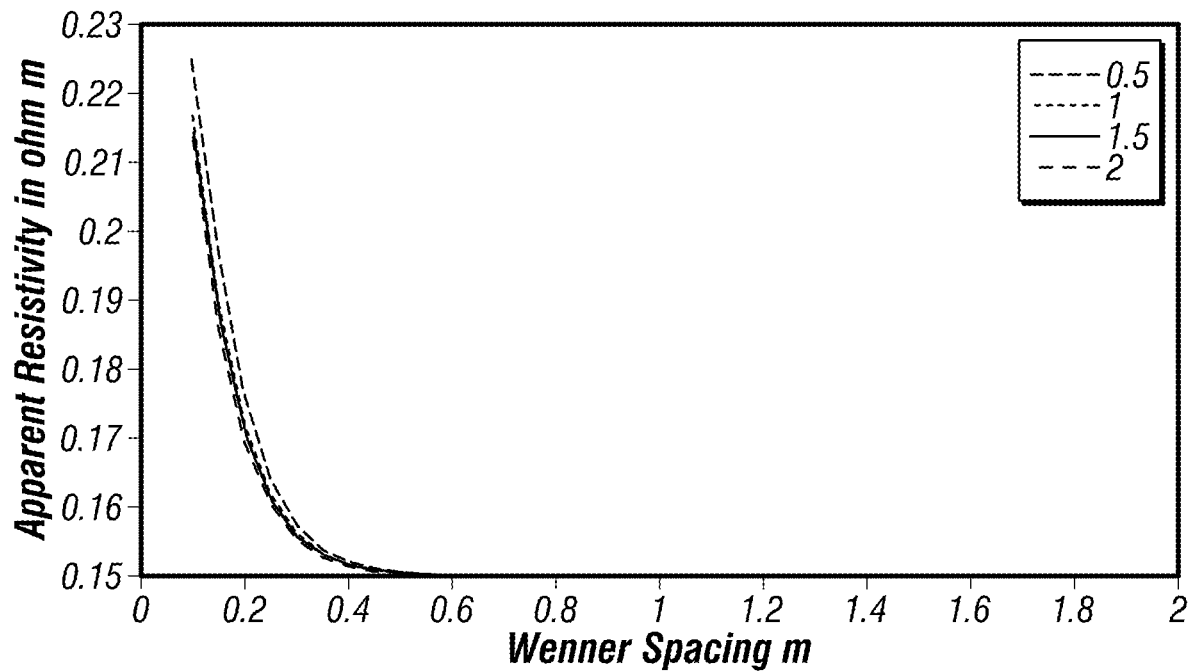
FIG. 11 shows a graph of variation of apparent resistivity with respect to distance between (0.5 to 2 m) tracks d for a constant insulator thickness.

FIG. 11 shows a graph of variation of apparent resistivity with respect to distance between (0.5 to 2 m) tracks d for a constant insulator thickness of 10 cm for the arrangement shown in FIG. 4. The current electrodes A, B are disposed on one track and the voltage measuring electrodes M, N are disposed on the other track. The situation is a sediment with a layer at 0.3 m depth. The top sediment has resistivity of 0.6 ohm-m and the lower sediment has a resistivity of 0.6 ohm-m. The insulating layer has a thickness of 10 cm. Above the insulating layer is water of resistivity 0.2 ohm-m.

Figure 12:
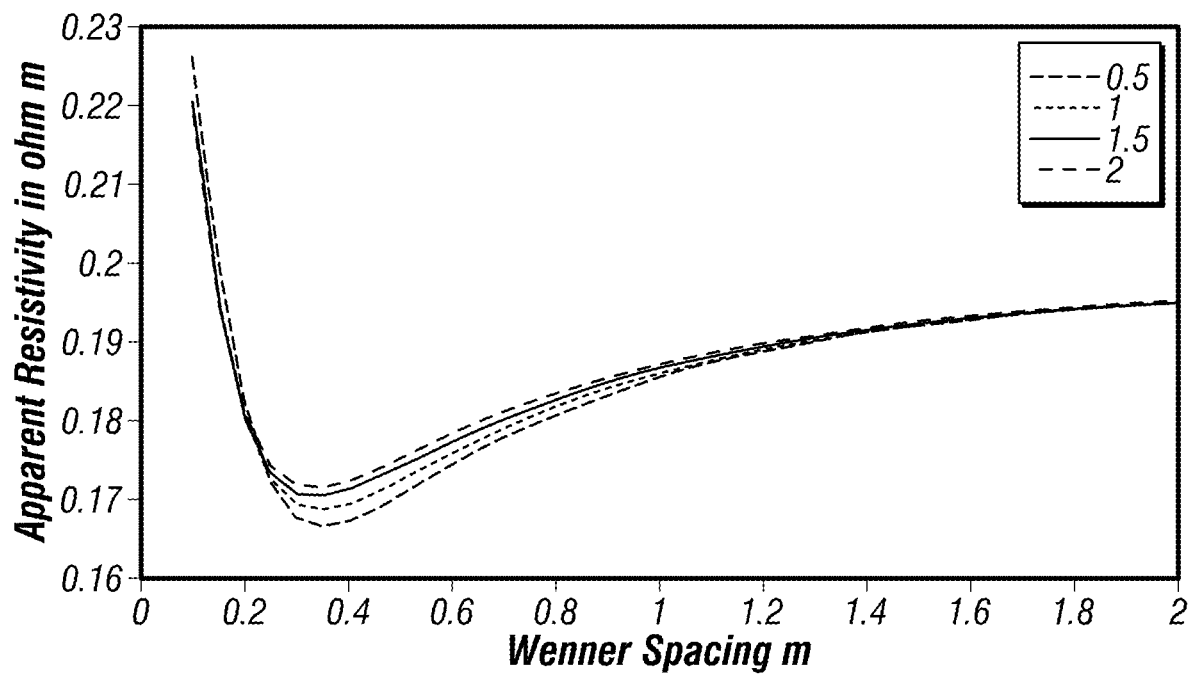
FIG. 12 shows a graph of variation of apparent resistivity with respect to distance between (0.5 to 2 m) tracks d for constant insulator thickness.

FIG. 12 shows a graph of variation of apparent resistivity with respect to distance between (0.5 to 2 m) tracks d for constant insulator thickness of 10 cm for the arrangement shown in FIG. 4. The current electrodes A, B are disposed on one track and the voltage measuring electrodes M, N are disposed on the other track. The situation is a sediment with a layer at 0.3 m depth. The top sediment has resistivity of 0.6 ohm m and the lower sediment has a resistivity of 0.8 ohm m. The insulating layer has thickness of 10 cm. Above the insulating layer is water of resistivity 0.2 ohm-m.

The apparent resistivity values obtained as explained above may be used in an inversion process to obtain a spatial distribution of sediment and/or formation electrical resistivity below the vehicle (13 in FIG. 1). One such inversion process is described in U.S. Pat. No. 7,574,410 issued to Strack and U.S. Pat. Nos. 7,356,411 and 7,328,107 issued to Strack et al. In some embodiments, the spatial distribution of resistivity within a volume coextensive with an acoustically imaged volume as described in U.S. Pat. No. 9,030,914 issued to Guigné et al. may be combined so that a relationship between electrical resistivity and sediment pore volume and pore structure may be defined. Such relationship is known as the formation factor (F) and for certain clastic formations is defined empirically with respect to fractional volume of pore space (porosity). For water bottom sediments, the formation factor may also be related to pore structure, and known empirical relationships may not provide accurate values of the formation factor using only porosity, or conversely, using determined resistivity to estimate porosity. By more accurately defining the formation factor, volumetrically coextensive acoustic imaging and resistivity distribution determination may enable more precise mapping of spatial distribution of petrophysical parameters such as porosity.

Figures 13, 14:
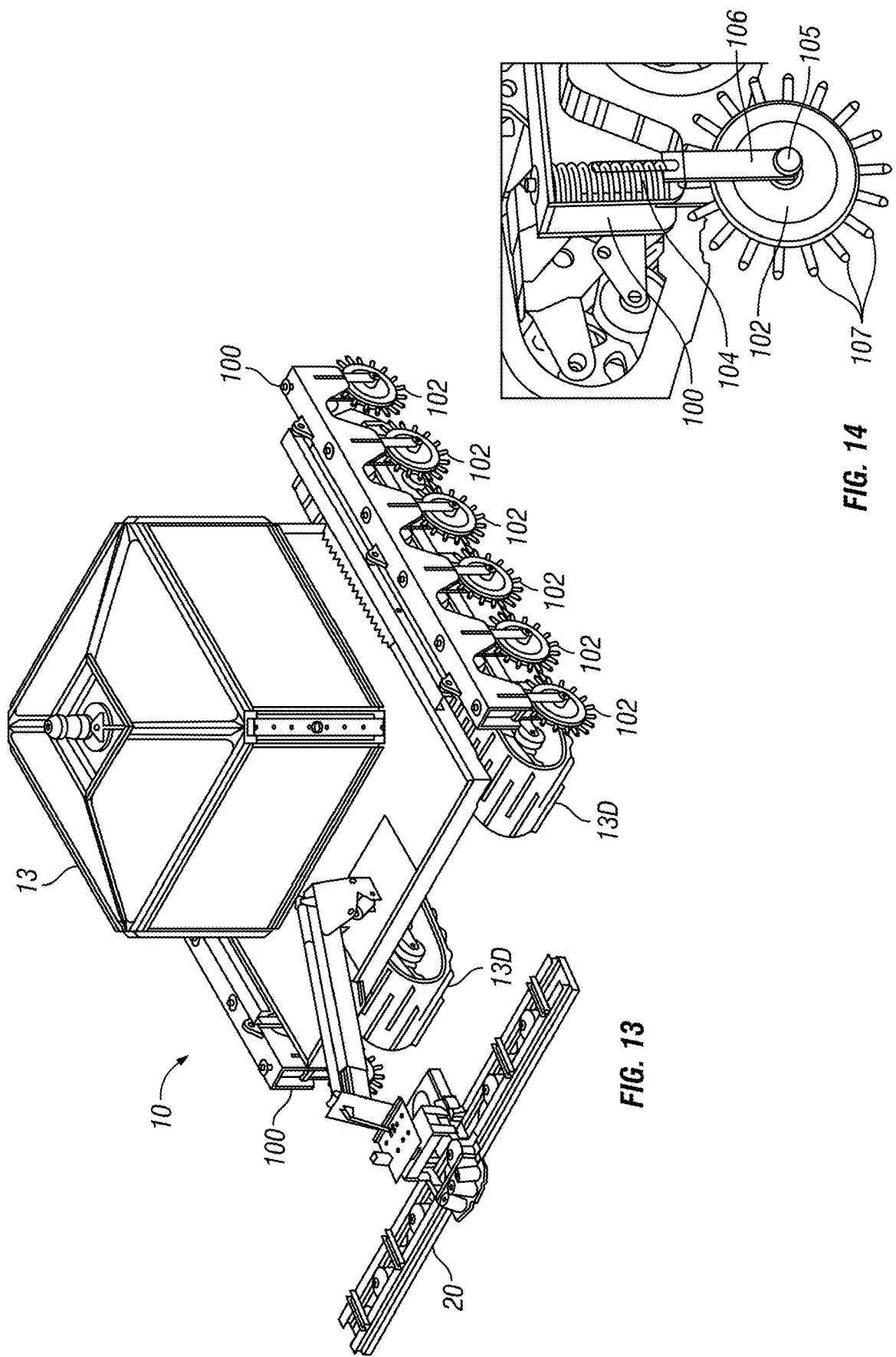
FIG. 13 shows another example embodiment of the vehicle of FIG. 1.
FIG. 14 shows a detail of a measurement electrode wheel that may be used on the vehicle of FIG. 13.

Another example embodiment of a vehicle that can be used in sub-bottom geophysical imaging is shown schematically in FIG. 13. The vehicle 10 may comprise all the vehicle components described with reference to FIG. 1 related to navigation, propulsion, the boom and accompanying transducers, electrodes and propulsion tracks 13D. In the present example embodiment, resistivity electrodes may be in the form of electrically conductive wheels 102 each suspended and electrically insulated from a resistivity electrode frame 100 affixed to one both sides of the vehicle 10. In the present example embodiment, the resistivity electrode frames 100 may be disposed outboard of the tracks 13D. Lateral spacing between the tracks 13D may be chosen to provide a desired lateral electrode spacing for purposes of imaging the subbottom. In the present example embodiment, electrodes (A, B, M, N) may be included in or on the tracks 13D as explained with reference to FIGS. 3 and 4 or such track-based electrodes may be omitted. The present example embodiment includes six electrodes (wheels 102) on each track, however more or fewer electrodes may be used in other embodiments.

Referring to FIG. 14, which shows one of the wheels 102 in more detail, each wheel 102 may be rotatably supported on a corresponding axle 105. The axle 105 may be affixed to a jack frame 106. The jack frame 106 may be extended from and retracted into the electrode frame 100 by a suitable jacking mechanism 104, such as a hydraulic cylinder and ram, a jack screw and ball nut, or any other jacking mechanism known in the art. Any of the axle 105, the jack frame or the jacking mechanism 104 should provide electrical insulation between the electrode frame 100 and the respective wheel 102. Operating of each jacking mechanism 104 may be individually controlled from the propulsion and directional control system 13. Each wheel 102 may comprise a plurality of radially extending spikes or pins 107 to make electrical contact with formations in the sub-bottom. The spikes or pins 107 may be made from electrically conductive material the same as or different from that of the wheel 102. Thus, individual wheels 102 may be placed into electrical contract with the water bottom (9 in FIG. 14) and connected to measuring circuits (not shown separately) in the propulsion and directional control system 13 for selective imaging of the sub-bottom with respect to electrical resistivity of the formations in the sub-bottom. In the embodiment shown in FIGS. 13 and 14, the tracks 13D may be made from or covered with electrically insulating material to reduce the effects of the vehicle 10 on the measurements made through the wheel-based electrodes 102. In the present example embodiment, each of the electrodes may be electrically connected separately to suitable switching circuits (not shown separately) so that each individual electrode may be connected to a chosen current source or voltage measuring circuit.

The example embodiment of the vehicle of FIG. 13 may have six wheels on each electrode frame 100. The wheels 102 in some embodiments may be longitudinally spaced by 0.5 meters, to produce an array span of 3 meters. In some embodiments, the electrode frames 100 may be laterally spaced from each other by 3 meters. Other embodiments may have different inter-wheel and lateral electrode frame spacing consistent with the scope of the present disclosure.

By using 6 wheels on each side of the vehicle 10, then the apparent formation resistivity at 5 different depths down to 2.5 meters can be obtained using a perpendicular dipole electrode arrangement and a further measurement at 3 meters depth using a cross perpendicular dipole. Thus at one position of the vehicle 10, the apparent resistivity can be obtained at 6 different depths below the water bottom (9 in FIG. 14).

If suitable electronic switching is available in the control unit 13, these measurements can be obtained by changing the electrodes used to emit and return measuring current, and to measure voltage. As the vehicle 10 moves, these measurements can be repeated at distances determined by the electronic switching capability and the speed of the vehicle.

Referring to Table 1 below, each wheel (electrode) may be identified by numbers 1 through 6 on one side of the vehicle and 7 through 12 on the opposite side of the vehicle. For each table entry, electrodes to be used as current source and return, and voltage measurement pairs are identified by number.

and voltage electrodes to be changed so that the same apparent resistivities can be measured using different electrical paths through the seabed leading to statistical improvements. There are more combinations that might be used in other embodiments.

In some embodiments, one or more of the electrodes (e.g., 102 in FIG. 13) may be used as a source or return for focusing current. In such embodiments, a focusing current source may be provided as part of the propulsion and control system. Suitable switches (not shown separately) may be provided to emit and return focusing current from selected ones of the electrodes to constrain the flow path of measuring current. By such electrical focusing, the depth of any set of measurements may be increased. Measuring current and focusing current circuits and electrode configurations such as those described in U.S. Pat. No. 6,060,886 issued to Tabarovsky et al. may be used in some embodiments to obtain adjustable depth of investigation for resistivity measurements.

In another embodiment, additional electrode wheels (at least one pair) may be pulled behind the vehicle 10 at distances from 4 meters to ten meters to extend the imaging depth from 3 meters to as much as 5 meters to 10 meters. Such electrode wheels may be affixed to a small wagon being towed by the vehicle by a strengthened umbilical cable released behind the vehicle 10. In such embodiments, measuring current may be transmitted from the these additional wheels and voltages may be measured across selected ones of the twelve electrodes deployed from respective electrode frames. This arrangement may be referred to as the Guigné-Pace array.

A sled or wagon towed by the vehicle may comprise two runners with two in-line current electrode wheels, which may be configured similarly to the wheels (102 in FIG. 14) proximate the tracks (13D in FIG. 13), numbered 13 and 14, and symmetrically placed in the center or the tracks (13D in

TABLE 1

| Array Type | Current | Voltage | Voltage | Voltage | Voltage | Voltage | Depths, m |
|---|---|---|---|---|---|---|---|
| Wenner | 3, 4 | 2, 5 | | | | | 0.5 |
| (Wenner alpha) | 9, 10 | 8, 11 | | | | | |
| Parallel | 1, 2 | 3, 4 | 4, 5 | 5, 6 | | | 1, 1.5, 2 |
| dipole | 5, 6 | 3, 4 | 2, 3 | 1, 2 | | | |
| (dipole- | 7, 8 | 9, 10 | 10, 1 | 11, 12 | | | |
| dipole) | 11, 12 | 9, 10 | 8, 9 | 7, 8 | | | |
| Perpendicular | 1, 7 | 2, 8 | 3, 9 | 4, 10 | 5, 11 | 6, 12 | .5, 1, 1.5, 2, |
| dipole | 6, 12 | 5, 11 | 4, 10 | 3, 9 | 2, 8 | 1, 7 | 2.5 |
| (equatorial dipole-dipole) | | | | | | | |
| Cross | 7, 8 | 1, 2 | | | | | 3 |
| perpendicular | 9, 10 | 3, 4 | | | | | 3 |
| dipole | 11, 12 | 5, 6 | | | | | 3 |

The Wenner array can be implemented on both of the electrode lines giving the apparent resistivity below each line. Similar measurements may be made for the parallel dipole. With the perpendicular and cross perpendicular arrays the apparent resistivity pertains to a line below the center of the vehicle. The symmetry of the arrays allows, with suitable electronic switching, the assignment of current FIG. 13). In the table below as an example, the additional towed electrode wheels are set at 4 m behind the aftmost two wheels on the vehicle. The distance of the wagon or sled behind the vehicle can readily be changed by extending or retracting the tow line (umbilical cable), thus giving additional control over measurement depths, in an adaptive manner.

TABLE 2

| Array | Current | Voltage | Voltage | Voltage | Voltage | Voltage | Depths, m |
|---|---|---|---|---|---|---|---|
| Wenner (Wenner alpha) | 3, 4<br>9, 10 | 2, 5<br>8, 11 | | | | | 0.5 |
| Parallel dipole (dipole-dipole) | 1, 2<br>5, 6<br>7, 8<br>11, 12 | 3, 4<br>3, 4<br>9, 10<br>9, 10 | 4, 5<br>2, 3<br>10, 1<br>8, 9 | 5, 6<br>1, 2<br>11, 12<br>7, 8 | | | 1, 1.5, 2 |
| Perpendicular dipole (equatorial dipole-dipole) | 1, 7<br>6, 12 | 2, 8<br>5, 11 | 3, 9<br>4, 10 | 4, 10<br>3, 9 | 5, 11<br>2, 8 | 6, 12<br>1, 7 | .5, 1, 1.5, 2, 2.5 |
| Cross perpendicular dipole | 7, 8<br>9, 10<br>11, 12 | 1, 2<br>3, 4<br>5, 6 | | | | | 3<br>3<br>3 |
| Guigne-Pace Array | 13, 14<br>13, 14 | 6, 12<br>11, 12 | 5, 11<br>9, 10 | 4, 10<br>7, 8 | 3, 9<br>5, 6 | 2, 8<br>4, 3 | 4, 4.5, 5, 5.5, 6 |

The results of the measurement of apparent resistivity across the various electrode pairs may be plotted at any position determined by the center of the measurement array and at a depth determined by the spacing of the electrodes. These positions are a useful way to present measurements but the resistivity that determines the measured value are the resistivity along the path followed by the current between the electrodes. The inversion of the measured apparent resistivities to the actual spatial values of the resistivity may be performed by optimization or inversion techniques as explained above.

Figure 15:
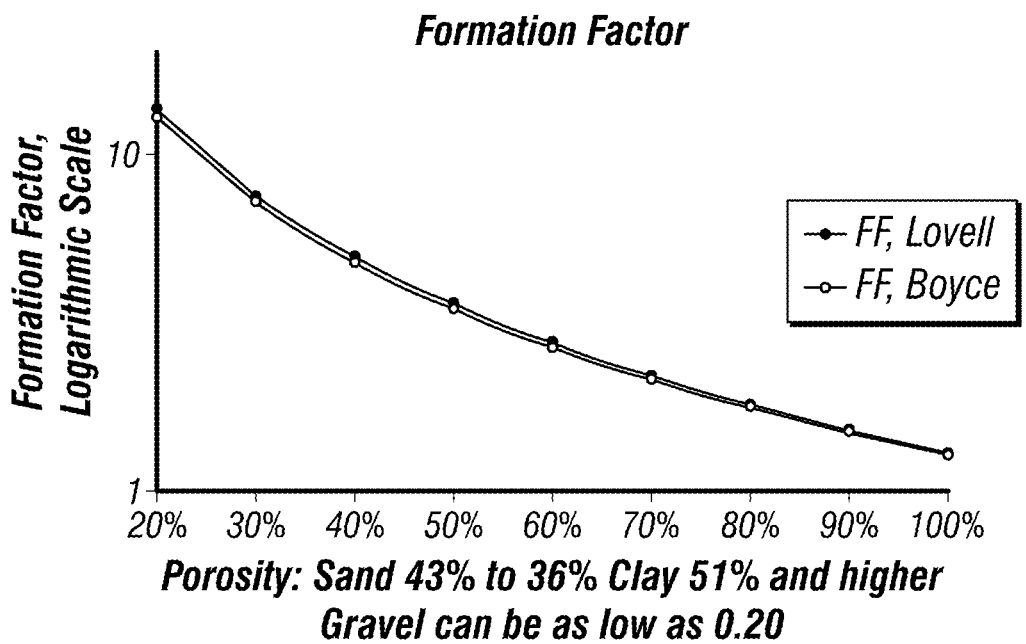
FIG. 15 shows an example embodiment of using resistivity to determine formation factor.

Resistivity of the formations determined as explained above may be used to estimate porosity of the formations using the formation resistivity factor (F), as shown in more detail in FIG. 15. As is known in the art, formation resistivity factor (F) is related to the formation resistivity with respect to resistivity of fluid filling pore spaces of a porous formation. In some embodiments, measured resistivity may be used to quantitatively estimate formation factor using direct measurements of water resistivity proximate the water bottom (9 in FIG. 1) using the water resistivity sensor (7 in FIG. 1). Estimates of formation factor may be used to estimate formation porosity using, e.g., empirical relationships such as the Archie relationship.

In some embodiments, the boom (20 in FIG. 1) may comprise a parametric array acoustic source. A possible use of a parametric acoustic source is to enable determining bulk attenuation properties of the sub-bottom formations, e.g., in the first 3 meters below the water bottom. Such determinations made by the moving vehicle may be thought of as a rolling Mean Attenuation within a moving fixed volume defined by a 3 m depth of formations.

An acoustic transducer may be excited with a waveform whose center frequency may be referred to as the primary frequency. The envelope of the waveform at the primary frequency $f_p$ may be chosen such that as a result of the non-linear acoustic properties of the water, a waveform centered on a difference frequency $f_d$ will be produced. The difference frequency waveform will be such that it has a bandwidth of several kHz distributed over a time duration of $\tau$ secs. A parametric array at a height L (e.g., 3 m) above a sediment is terminated at the water/sediment interface. An acoustic energy beam propagates into the sediment. A return signal due to reverberation in the sediment is returned to a conventional receiver or sensor that may be collocated with the transmitter or source.

The returned signal from a depth x below the water/sediment interface depends on the parametric signal pressure at x and the volume producing the reverberation determined by the effective solid angle of the parametric array at x and the receiving aperture and the reverberation strength.

Given that the amplitude of the parametric signal is proportional to $f_d^2$, normalization of the received signal by its amplitude at $f_{d1}$ will provide the frequency dependence introduced by the sediment attenuation and the effective solid angle dependence on frequency.

Let the on axis parametric signal at a depth x below the interface be represented by $P_0(x)f_d^2$ and the attenuation in the sub-bottom formations be represented $b_1$ (nepers per m per kHz) then the signal received may be represented by the expression:

$$P(x, f_d) = P_0(x) f_d^2 e^{-2b_1 x f_d} \sqrt{R(x, f_d)}$$

where R represents the effect of scatter from the formations. $b_1$ is in units of nepers per m per kHz.

If $S(x, f_d)$ is $P(x, f_d)$ normalized by $P(x, f_{d1})$ then $$S(x, f_d) = e^{2b_1 x (f_{d1} - f_d)} \frac{f_d}{f_{d1}}$$

where the ratio of $R(x, f_d)$ to $R(x, f_{d1})$ is approximately $$\left(\frac{f_{d1}}{f_d}\right)^2$$

due to the effective solid angles, assuming the volume scattering strength of the sediment is independent of frequency.

$$\langle b_1(x) \rangle = \frac{1}{f_{d2} - f_{d1}} \int_{f_{d1}}^{f_{d2}} \frac{1}{2x(f_{d1} - f_{d2})} \log_e \{S(x, f_d)\} df_d$$

And the average attenuation over the sediment depth to x is $$\langle b \rangle = \frac{1}{x} \int_0^x \langle b_1(x) \rangle dx \text{ nepers } m \text{ per kHz}$$

The primary frequency may be chosen, as explained below, to ensure transmitting enough acoustic power into the interaction region in the water before the water bottom is reached.

The difference frequency attenuation in the formations is about 0.5 dB per m per kHz. The attenuation over the double transit path length of 6 m in the formations at 20 kHz is about 60 dB while at 30 kHz the attenuation increases to 90 dB. So attention measurement may be focused on a 20 kHz difference frequency.

The cavitation limit for low frequencies and long acoustic pulses is 0.3 watts/cm$^2$. In the range of frequencies above 100 kHz, and for short pulse time, the cavitation limit can be 30 times higher. Bulk attenuation calculated using calculations as explained above may be used as a validation of resistivity measurements made using the apparatus described above. Bulk attenuation may be related to porosity of the sub-bottom formations; assuming constant fluid resistivity, the formation resistivity will be related correspondingly. In some instances, presence of gas in some shallow formations, and corresponding drilling hazards, may be confirmed by anomalously high resistivity and high bulk attenuation.

Figure 16:
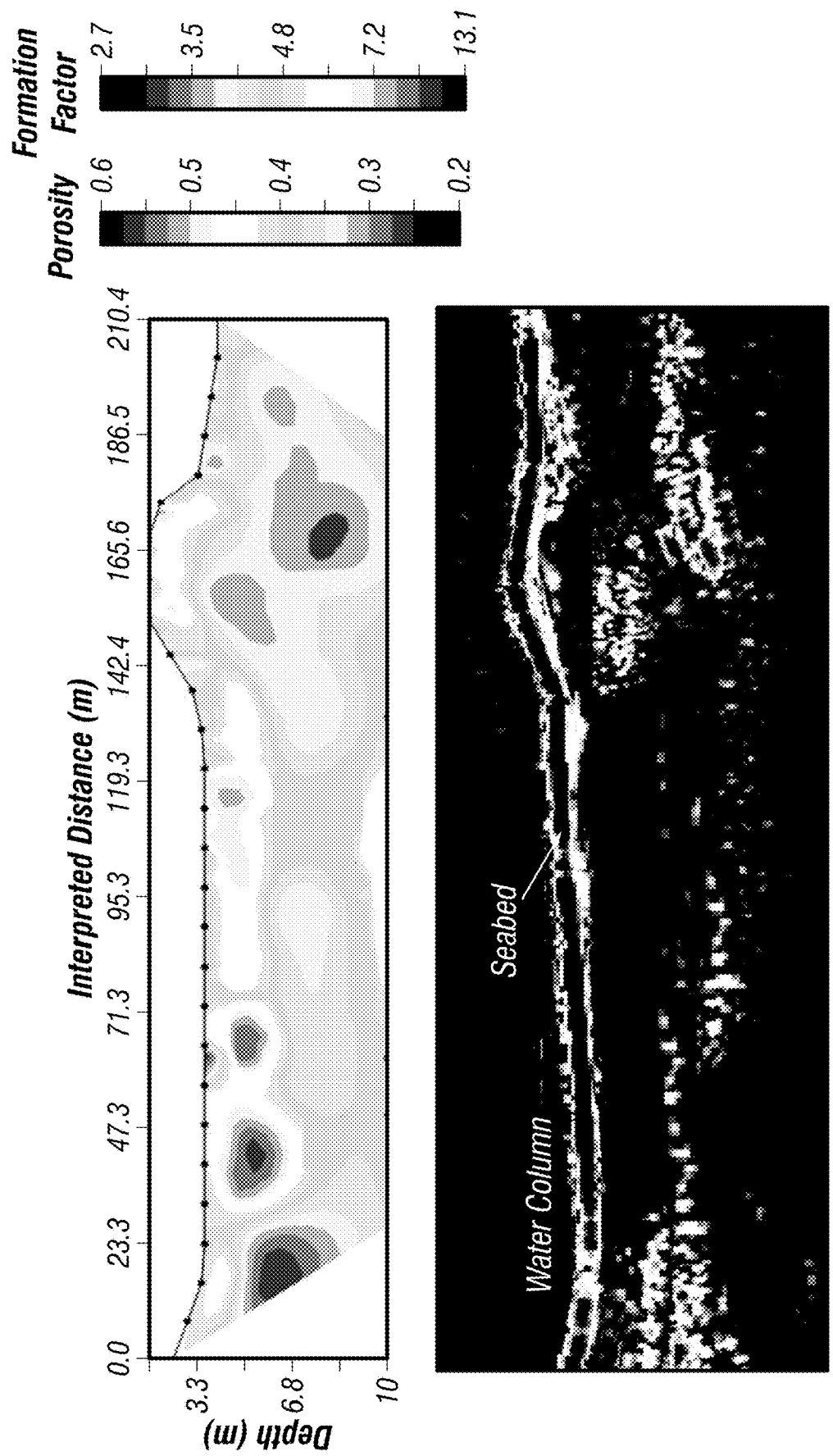
FIG. 16 shows an example combined acoustic and resistivity image that may be generated using measurements from some embodiments of a survey vehicle.

Using resistivity determination as explained above, as well as acoustic imaging explained above, it is possible to generate a combination spatial plot of resistivity and acoustic properties of the sub-bottom. FIG. 16 shows an example embodiment of such a combined plot, wherein resistivity values are plotted in space in variable density (gray scale) form. Corresponding spatial distribution of acoustic properties, such as compressional velocity imaged in gray scale form, is shown in the bottom part of FIG. 16.

Figure 17:
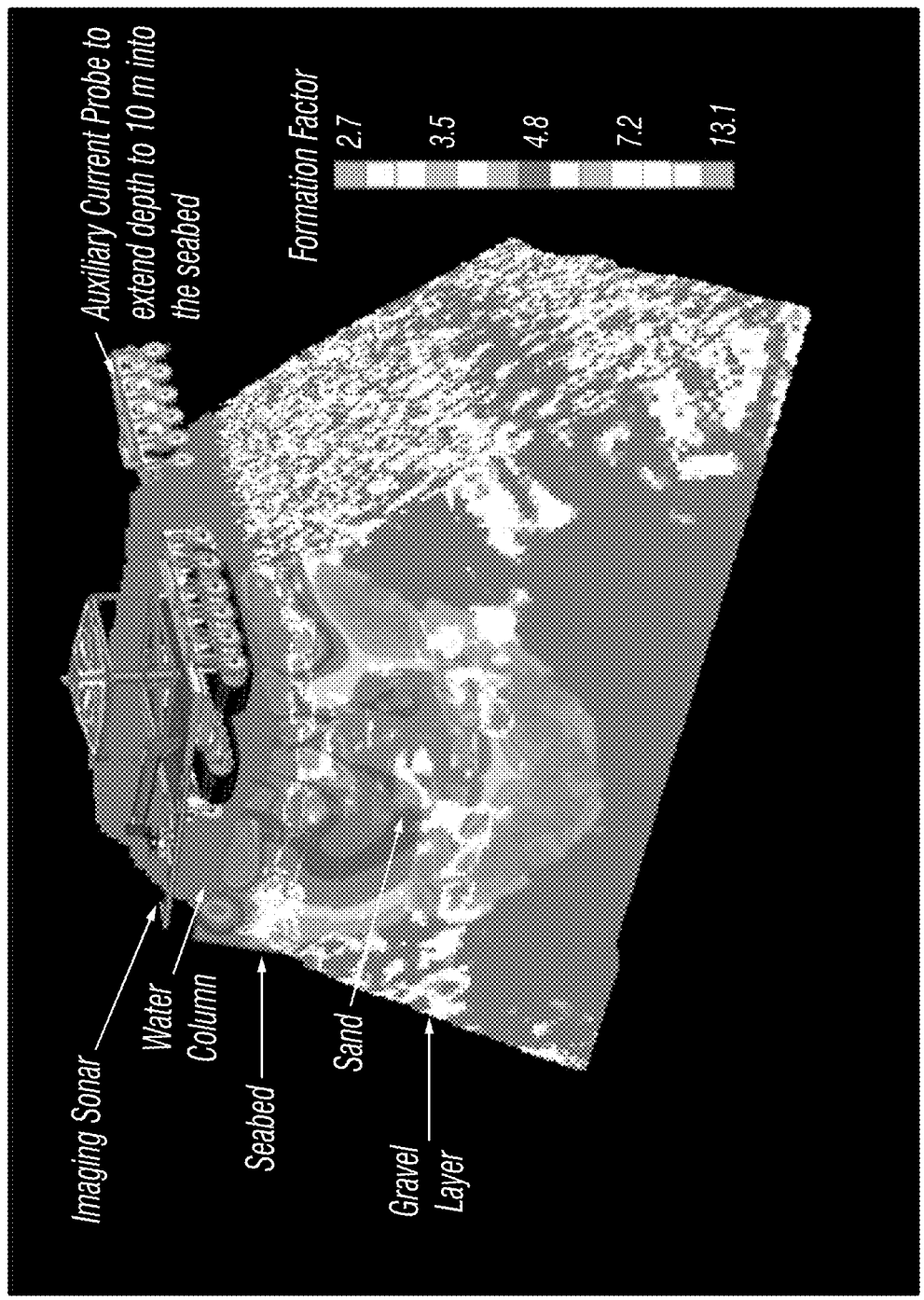
FIG. 17 shows a perspective view of a 3 dimensional plot of the vehicle of FIG. 13 on a subsurface structure imaged with respect to formation factor.

It is also possible to plot spatial distribution of properties determined as explained above, such as formation factor, in three dimensions. FIG. 17 is an example of such a plot of formation factor determined from resistivity.

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. A sub-bottom geophysical imaging apparatus, comprising:
   a carriage assembly having mounted thereon at least one acoustic transmitter, and at least one acoustic receiver mounted proximate the transmitter;
   a line array of acoustic receivers mounted on the carriage assembly in a direction transverse to a direction of motion of the carriage assembly;
   a position determining transponder mounted on the carriage assembly;
   a plurality of position determining transponders disposed at spaced apart positions and configured to communicate with the transponder mounted on the carriage assembly;
   at least two tracks for moving the carriage assembly to selected positions above a bottom of a body of water;
   current source and voltage measuring electrodes for a resistivity sensor, and a shear acoustic transmitter and receiver disposed in at least one of the pair of tracks so as to move with the carriage assembly; and
   a signal detection and processing unit configured to coherently stack and beam steer signals detected by the line array of acoustic receivers, the electrodes and the shear acoustic transmitter and receiver, the signal detection and processing unit configured to record signals detected by the line array of acoustic receivers, the electrodes and the shear acoustic transmitter and receiver.

2. The sub-bottom geophysical imaging apparatus of claim 1 further comprising a frame deployable on the water bottom, the frame having a grid of support cables thereon, the carriage assembly configured to move along the grid of support cables.

3. The sub-bottom geophysical imaging apparatus of claim 1 wherein the means for moving comprises at least one of a remotely operated underwater vehicle and an autonomously operated underwater vehicle.

4. The sub-bottom geophysical imaging apparatus of claim 3 wherein the at least one of a remotely operated underwater vehicle and an autonomously operated underwater vehicle comprises a boom extending therefrom, and further comprising at least one acoustic receiver mounted proximate the transmitter and the line array of acoustic receivers are movably mounted on the boom.

5. The sub-bottom geophysical imaging apparatus of claim 4 further comprising a sensor for determining position of the at least one acoustic receiver mounted proximate the transmitter and the line array of acoustic receivers with reference to the boom.

6. The sub-bottom geophysical imaging apparatus of claim 4 wherein the vehicle comprises means for rotating the boom to a selected rotary orientation.

7. The sub-bottom geophysical imaging apparatus of claim 1 wherein the at least one acoustic transmitter comprises a chirp projector.

8. The sub-bottom geophysical imaging apparatus of claim 7 further comprising three chirp projectors arranged on the carriage assembly to emit acoustic energy in a predetermined pattern along the water bottom.

9. The sub-bottom geophysical imaging apparatus of claim 1 wherein the signal detection and processing unit further comprises means for determining a sub-bottom velocity model from signals detected by the at least two line arrays and signals detected by the at least one acoustic receiver proximate the at least one acoustic transmitter.

10. The sub-bottom geophysical imaging apparatus of claim 1 wherein the current source electrodes and voltage measuring electrodes disposed in an electrically insulating layer affixed to the at least one track.

11. The sub-bottom geophysical imaging apparatus of claim 1 wherein at least some of the electrodes are disposed in a plurality of wheels rotatably supported from an electrode frame.

12. The sub-bottom geophysical imaging apparatus of claim 11 wherein each of the wheels comprises a plurality of radially extending spikes about a circumference of each wheel.

13. A method for imaging formations below the bottom of a body of water, comprising:
   imparting acoustic energy into the formations along a predetermined length swath at a selected geodetic position using at least one acoustic transmitter mounted to a carriage assembly;
   detecting acoustic energy reflected from the formations along a line parallel to the length of the swath at the selected geodetic position using a line array of acoustic receivers mounted to the carriage assembly;
   moving the selected geodetic position a selected distance transverse to the length of the swath;

repeating the imparting acoustic energy, detecting acoustic energy and moving the selected geodetic position until a selected distance transverse to the length of the swath is traversed;
coherently stacking the detected acoustic energy from all the selected geodetic positions;
emitting electric current into the formations through electrodes disposed in a track used to move the carriage assembly so as to move with the carriage assembly;
detecting voltage induced by the electric current across electrodes disposed proximate to the track;
emitting and detecting shear acoustic energy using shear acoustic transducers disposed in the track; and
beam steering the detected acoustic energy to each of a plurality of depths and positions along the length of the swath, calculating a resistivity and calculating shear acoustic properties to generate an image for each such depth and position.

14. The method of claim 13 further comprising (a) moving the position of imparting acoustic energy, emitting and detecting voltage and emitting and detecting shear acoustic energy a selected distance along the length of the swath, and (b) repeating the imparting acoustic energy, detecting acoustic energy, emitting and detecting voltage and emitting and detecting shear acoustic energy and moving the geodetic position transversely to the length of the swath, and repeating (a) and (b) until a selected area of the water bottom has been traversed.

15. The method of claim 14 further comprising:
(c) detecting acoustic energy reflected from the formations at a plurality of positions using at least two substantially orthogonal line arrays of receivers disposed on the water bottom;
(d) beam steering the detected acoustic energy, as defined in (c), to each of a plurality of depths and positions to generate an image for each such depth and position, to enhance forward scatter of the sub-bottom;
(e) detecting acoustic energy reflected from the formations at a position proximate the position of imparting acoustic energy;
(f) beam steering the detected acoustic energy, as defined in (e), to each of a plurality of depths and positions to generate an image for each such depth and position, to enhance backscatter of the sub-bottom;
(g) detecting reflected acoustic energy at each time when the position of imparting acoustic energy is coincident with a position of each receiver in the orthogonal arrays;
(h) processing the data, as defined in (g), by enhancement of specular reflections to obtain a velocity model of the sub-bottom;
(i) generating a model of acoustic velocity distribution using the detected acoustic energy from each of (c) through (h); and
(j) using the acoustic velocity distribution model to correct the images generated from the beam steered, coherently stacked detected acoustic energy.

16. The method of claim 13 wherein the moving of the selected geodetic position comprises:
determining a geodetic position of the carriage assembly;
extending a frame along a boom extending laterally in a selected direction from the carriage assembly by a selected amount, the frame having mounted thereon a least one acoustic transmitter and a line array of acoustic receivers oriented transversely to a direction of the boom; and
repeating the imparting acoustic energy, detecting acoustic energy and extending the frame until a selected distance transverse to the length of the swath is traversed.

17. The method of claim 16 wherein the determining geodetic position of the carriage assembly comprises determining acoustic energy travel time between a transponder disposed on the carriage assembly and a plurality of spaced apart transponders disposed proximate the water bottom.

18. The method of claim 17 further comprising rotating the boom substantially transversely to a first side of the selected direction and repeating the extending, the imparting acoustic energy, detecting acoustic energy and extending the frame until a selected distance transverse to the length of the swath is traversed.

19. The method of claim 17 further comprising rotating the boom substantially to a second side of the selected direction and repeating the extending, the imparting acoustic energy, detecting acoustic energy and extending the frame until a selected distance transverse to the length of the swath is traversed.

20. The method of claim 19 further comprising moving the carriage assembly in a selected direction, returning the boom to the selected direction and repeating the extending, the imparting acoustic energy, detecting acoustic energy and extending the frame until a selected distance transverse to the length of the swath is traversed.

21. The method of claim 20 further comprising rotating the boom substantially transversely to a first side of the selected direction and repeating the extending, the imparting acoustic energy, detecting acoustic energy and extending the frame until a selected distance transverse to the length of the swath is traversed.

22. The method of claim 21 further comprising rotating the boom substantially to a second side of the selected direction and repeating the extending, the imparting acoustic energy, detecting acoustic energy and extending the frame until a selected distance transverse to the length of the swath is traversed.

23. The method of claim 13 further comprising emitting electric current into the formations through each of a plurality of pairs electrodes disposed in the track; detecting voltage induced by the electric current across each of a plurality of pairs of electrodes disposed proximate to the track; and calculating an image of apparent resistivity of sub-bottom formations using the detected voltages.

24. The method of claim 13 further comprising determining acoustic attenuation from the detected acoustic energy.

* * * * *